US 7,757,888 B2

(12) United States Patent
Ogura (10) Patent No.: US 7,757,888 B2
(45) Date of Patent: Jul. 20, 2010

(54) TELESCOPING CUP HOLDER FOR AUTOMOTIVE CONSOLES

(75) Inventor: Mitsuo Ogura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 197 days.

(21) Appl. No.: 12/213,898

(22) Filed: Jun. 26, 2008

(65) Prior Publication Data

US 2009/0039095 A1 Feb. 12, 2009

(30) Foreign Application Priority Data

Aug. 8, 2007 (JP) .............................. 2007-206805

(51) Int. Cl.
- B65D 8/14 (2006.01)
- B60R 7/04 (2006.01)
- B60R 7/06 (2006.01)
- B60R 11/00 (2006.01)

(52) U.S. Cl. ...................... 220/737; 220/8; 220/345.1; 224/485; 224/926; 248/311.2; 296/24.34

(58) Field of Classification Search .............. 220/8, 220/345.1, 737, 738; 224/275, 483–486, 224/926; 296/24.34; 297/188.14, 188.15, 297/188.19

See application file for complete search history.

(56) References Cited

U.S. PATENT DOCUMENTS

| 1,957,293 | A | * | 5/1934 | Reilly | .................... | 206/250 |
| 1,985,615 | A | * | 12/1934 | August | .................... | 206/527 |
| 4,583,707 | A | * | 4/1986 | Anderson | .................... | 248/292.13 |
| 4,759,584 | A | * | 7/1988 | Dykstra et al. | .................... | 297/188.16 |
| 5,018,633 | A | * | 5/1991 | Toth et al. | .................... | 248/311.2 |
| 5,342,009 | A | * | 8/1994 | Lehner | .................... | 248/311.2 |
| 5,634,621 | A | * | 6/1997 | Jankovic | .................... | 248/311.2 |
| 5,697,593 | A | * | 12/1997 | Bieck | .................... | 248/311.2 |
| 6,834,838 | B2 | * | 12/2004 | Dennis et al. | .................... | 248/311.2 |
| 7,036,700 | B2 | * | 5/2006 | Engel et al. | .................... | 224/501 |
| 7,354,086 | B2 | * | 4/2008 | Park | .................... | 296/24.34 |
| 7,455,341 | B2 | * | 11/2008 | Miyashita | .................... | 296/37.12 |
| 7,520,405 | B2 | * | 4/2009 | Ishida et al. | .................... | 220/737 |
| 7,562,854 | B2 | * | 7/2009 | Bieck et al. | .................... | 248/311.2 |
| 2004/0069792 | A1 | | 4/2004 | Schaal | | |

(Continued)

FOREIGN PATENT DOCUMENTS

DE 4200823 A1 * 7/1993

(Continued)

*Primary Examiner*—Anthony Stashick
*Assistant Examiner*—Ned A Walker
(74) *Attorney, Agent, or Firm*—Posz Law Group, PLC (57) ABSTRACT

A cup holder includes a base, a cylindrical member, an urging device, a locking device, an unlocking device, a lid member, a reversing device, a non-service position, and a service position. At the non-service position, the cylindrical member descends fully, the lid member closes the cylindrical member's top opposite opening, and the lid member's top decorative surface is exposed. At the service position, the cylindrical member, which the urging device urges upward, ascends fully, and the reversing device reverses the lid member so that the lid member's bottom supporter surface is exposed, thereby supporting a bottom of container, which is inserted into the cylindrical member, with the lid member's bottom supporter surface. The cup holder can not only hold a container with a taller height securely but also prevent the lid member's top decorative surface from being damaged by the inserted container.

7 Claims, 8 Drawing Sheets

U.S. PATENT DOCUMENTS

| | | | |
|---|---|---|---|
| 2005/0269472 A1* | 12/2005 | Wagner et al. | 248/311.2 |
| 2006/0006185 A1* | 1/2006 | Katagiri | 220/740 |
| 2006/0113311 A1* | 6/2006 | Miyashita | 220/737 |
| 2006/0278790 A1* | 12/2006 | Park | 248/311.2 |
| 2007/0119855 A1* | 5/2007 | Ishida et al. | 220/737 |
| 2007/0227918 A1* | 10/2007 | Ogura et al. | 206/216 |
| 2007/0278372 A1* | 12/2007 | Okada et al. | 248/311.2 |
| 2008/0029672 A1* | 2/2008 | Ogura | 248/311.2 |

FOREIGN PATENT DOCUMENTS

| | | | |
|---|---|---|---|
| DE | 19630528 A1 * | 2/1998 | |
| DE | 19930524 A1 * | 2/2000 | |
| JP | 09071172 A * | 3/1997 | |
| JP | A-2003-165370 | 6/2003 | |
| JP | 2003200773 A * | 7/2003 | |
| JP | 2005053448 A * | 3/2005 | |
| JP | A-2005-112248 | 4/2005 | |
| JP | A-2005-206138 | 8/2005 | |
| JP | 2005324735 A * | 11/2005 | |
| JP | A-2005-324594 | 11/2005 | |
| JP | 2008221992 A * | 9/2008 | |
| JP | 2008221993 A * | 9/2008 | |
| JP | 2008247090 A * | 10/2008 | |

* cited by examiner

TELESCOPING CUP HOLDER FOR AUTOMOTIVE CONSOLES

INCORPORATION BY REFERENCE

The present invention is based on Japanese Patent Application No. 2007-206,805, filed on Aug. 8, 2007, the entire contents of which are incorporated herein by reference.

BACKGROUND OF THE INVENTION

1. Field of the Invention

The present invention relates to a cup holder, which is disposed in automotive passenger rooms. More specifically, it relates to a cup holder, which makes space saving attainable, that is, which occupies passenger-room space as less as possible, or which is downsized or made smaller.

2. Description of the Related Art

Considering the usability for a passenger who sits on the driver's seat and a passenger who sits on the navigator's seat, it has been thought of providing an automotive console with a cup holder. However, the console box has been already provided with a shift knob, and, in certain cases, the inside might be provided a duct for air-conditioning the rear seats. Therefore, in the console, the space that is available for the cup holder has become limited inevitably.

For example, when providing a console with a cup holder with a circular holder hole formed, there might arise such a case that it is not possible to securely provide the holder hole with a sufficiently deep depth because of the spatial limitation in the height direction. Such a cup holder cannot hold container having taller height.

In view of above, Japanese Unexamined Patent Publication (KOKAI) Gazette No. 2005-112,248 proposes a cup holder, which is provided with a lid body for closing a holder hole that is formed in an accommodation body; and in which the peripheral wall of the holder hole is made ascendable and descendible. This conventional cup holder can maintain a neat appearance because, at the descent position, the peripheral wall becomes flush with the lid body and with the accommodation body when it is not in service. Moreover, the conventional cup holder can securely make an available passenger-room space greater because it is possible to make its overall height shorter. In addition, when the conventional cup holder is in service, not only the peripheral wall ascends to protrude from the accommodation body so as to support the side surface of container, but also the lid body goes down so as to support the bottom of container. Therefore, when using the conventional cup holder, it is possible to hold container with taller height because it is possible to securely provide it with an ample height from the lid body to the peripheral wall's leading end.

However, the conventional cup holder has a complicated construction that uses an endless belt, for instance, because it is needed to ascend and descend the peripheral wall of the holder hole and to ascend and descend the lid body independently to each other. Accordingly, the conventional cup holder has problems in that it has become difficult to keep the operational accuracy high for a long period of time, and in that it has become highly costly because the number of component parts and the man-hour requirement of assemblage have become considerable. Moreover, since the conventional cup holder is made so that the lid body's decorative surface supports container, it has suffered from such a drawback that the decorative surface is likely to be damaged.

Moreover, Japanese Unexamined Patent Publication (KOKAI) Gazette No. 2005-206,138 sets forth a cup holder, which comprises a cup supporter plate that is disposed movably upward and downward in a holder hole. The gazette also sets forth not only to support the bottom of container with the cup supporter plate but also to turn the cup supporter plate upward to use it as a lid when the conventional cup holder is not in service. However, this second conventional cup holder is highly expensive so that it has not yet been used commonly at present, because it employs an electric motor as a constituent element for driving the cup supporter plate.

In addition, Japanese Unexamined Patent Publication (KOKAI) Gazette No. 2005-324,594 discloses a cup holder, which comprises a holder body, and a lid being disposed rotatably to the holder body. The lid has a decorative surface, and a supporter surface being disposed oppositely to the decorative surface. Moreover, the lid moves between a close position, at which the lid covers an opening of the holder body with the decorative surface being directed upward, and an open position at which the lid is accommodated in the inner accommodation space of the holder body with the supporter surface being directed upward. This third conventional cup holder makes it possible to inhibit the decorative surface from being damaged, because it is constructed so that the supporter surface, which is disposed oppositely to the decorative surface, supports the bottom of container. However, when the third conventional cup holder holds container with taller height, it might be associated with a drawback in view of available passenger-room space, because it is necessary to securely provide a large distance or dimension from the supporter surface, which is placed at the open position, to the opening of the holder body so that the holder body has been upsized. Moreover, it might be difficult to make the third conventional cup holder inexpensively, because it might possibly require a complicated mechanism for rotating the lid.

SUMMARY OF THE INVENTION

The present invention has been developed in view of the aforementioned circumstances. It is therefore an object of the present invention to provide a cup holder, which is securely provided with a required height for holding various containers within limited available passenger-room space, and which can be made less expensively.

A cup holder according to the present invention can solve the aforementioned problems, and comprises:

a base being formed as a container shape, and having an accommodation hole being opened upward;

a cylindrical member having opposite openings, being fitted around the base, being disposed coaxially with the accommodation hole of the base, and being disposed movably in up/down direction;

an urging device for urging the cylindrical member so as to move the cylindrical member upward;

a locking device for enabling the urging device to accumulate urging force, thereby retaining the cylindrical member in such a state that the cylindrical member is moved downward;

an unlocking device for canceling the retaining action of the locking device;

a lid member being disposed rotatably to the base, and having a top and a bottom, the top making a top decorative surface, the bottom making a bottom supporter surface being disposed oppositely to the top decorative surface, the top decorative surface and the bottom supporter surface being made reversible within the cylindrical member;

a reversing device being interlocked with the cylindrical member, which moves upward/downward, thereby reversing the top decorative surface and bottom decorative surface of the lid member;

a non-service position at which the cylindrical member descends fully, the lid member closes one of the opposite openings of the cylindrical member, and the top decorative surface of the lid member is exposed; and a service position at which the cylindrical member ascends fully, and the lid member is reversed to expose the bottom supporter surface, thereby supporting a bottom of container, which is inserted into the accommodation hole of the cylindrical member, with the bottom supporter surface of the lid member.

In the present cup holder, it is preferable that the urging device can urge the reversing device, thereby actuating the reversing device.

Moreover, in the present cup holder, it is preferable that the lid member can be formed as a bottomed cylindrical shape having a bottom outside surface and a bottom inside surface, and can comprise a rotary shaft being disposed at a central part thereof in height direction thereof; the bottom outside surface can make the top decorative surface; and the bottom inside surface can make the bottom supporter surface.

In addition, in the present cup holder, it is preferable that the bottom supporter surface of the lid member can comprise: a first supporter surface for supporting container with smaller outside diameter; and a step being disposed on an outer peripheral side with respect to the first supporter surface, and having a second supporter surface being disposed higher than the first supporter surface is disposed.

When the present cup holder is not in service, it exhibits a neat appearance because the lid member closes one of the opposite openings of the cylindrical member opening with its exposed decorative top surface so as to make the one of the opposite openings of the cylindrical member, a holder hole for holding container, which is opened in the cylindrical member, invisible. Moreover, the present cup holder makes it possible to produce a greater available passenger-room space in the vertical direction, that is, it is downsized in the vertical direction, because the cylindrical member overlaps with the base when it descends fully.

On the contrary, when the present cup holder is in service, it actuates the unlocking device to cancel the retaining action of the locking device. Then, the urging device urges the cylindrical member to ascend it by the urging force. Subsequently, the ascending cylindrical member actuates the reversing device, because the reversing device is interlocked with the cylindrical member. As a result, the reversing device rotates the lid member by 180 degrees to reverse it. Under the circumstances, when a container is inserted into the holder hole of the cylindrical member, the present container can hold it stably even if the container has a taller height, because the lid member's bottom supporter surface supports the container's bottom and the cylindrical member supports the container's side surface. Moreover, the present cup holder prevents the lid member's top decorative surface from being damaged, because the lid member's bottom supporter surface, which is disposed oppositely to the top decorative surface, supports the container.

Moreover, when the present cup holder is made so that the lid member is formed as a bottomed cylindrical shape having a bottom outside surface and a bottom inside surface, and comprises a rotary shaft being disposed at a central part thereof in height direction thereof; the bottom outside surface makes the top decorative surface; and the bottom inside surface makes the bottom supporter surface, it produces the following extra advantages. It is possible to earn or provide a greater distance or dimension from the bottom supporter surface of the lid member to the leading end of the cylindrical member. Accordingly, the present cup holder comes to have a much taller height for holding a container. Consequently, the present cup holder can stably hold a container with a much taller height. In addition, it becomes possible to shorten the height-wise length of the cylindrical member. Therefore, the above-described preferable construction enables the present cup holder to produce a greater available passenger-room space in the vertical direction, that is, the preferable construction makes it possible to downsize the present cup holder more in the vertical direction After a user finishes using the present cup holder, that is, after a user takes the container out of the cylindrical member, he or she presses the cylindrical member to move it downward against the urging force exerted by the urging device. Then, simultaneously therewith, the lid member rotates by 180 degrees in the opposite direction to the above-described rotary direction, and thereby reverses to expose the top decorative surface and eventually close one of the opposite openings of the cylindrical member. Thereafter, the locking device is actuated to keep the lid member in the thus reversed manner. As a result, the present cup holder demonstrates enhanced decorativeness.

In addition, when the present cup holder is made so that the bottom supporter surface of the lid member is provided with a first supporter surface for supporting container with smaller outside diameter; and a step being disposed on an outer peripheral side with respect to the first supporter surface, and having a second supporter surface being disposed higher than the first supporter surface is disposed, the present cup holder can hold a container, which has a larger outside diameter, by supporting it with the second supporter surface of the lid member's bottom supporter surface. Note herein that paper cups are usually formed as a truncated cone shape whose outside diameter decreases from large to small gradually in the direction away from the opening to the bottom. Accordingly, the present cup holder can hold a container with a larger outside diameter even when the cylindrical member has a smaller inside diameter, because it holds such a container by supporting it with the second supporter surface, which is disposed higher than the first supporter surface of the lid member's bottom supporter surface is disposed. Consequently, the present cup holder is downsized in the horizontal direction, and thereby makes it possible to produce a greater available passenger-room space horizontally.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

A cup holder according to the present invention comprises a base, a cylindrical member, and a lid member. The base has an accommodation hole. The cylindrical member is fitted around the base, and is disposed coaxially with the accommodation hole of the base. The lid member is disposed rotatably to the base, and has a top and a bottom. The top makes a decorative surface. The bottom makes a bottom supporter surface, which is disposed oppositely to the top decorative surface. The top decorative surface and bottom supporter surface are made reversible within the cylindrical member. The base is a receptacle-shaped component part, which has an accommodation hole being opened upward. For example, when the present cup holder is disposed in a console, it is allowable to form a dent into the console itself to make the base having an accommodation hole, or it is possible to fix the base, which is formed as a receptacle shape as another separate or independent component part, to a console.

The cylindrical member is a component part whose inner periphery makes a holder hole for holding container. The cylindrical member is fitted around the base concentrically with the base's accommodation hole, and is disposed movably in up/down direction. It is allowable to insert the cylindrical member into the base's inner periphery. However, in view of securely providing the cylindrical member's holder hole with a sufficient inside diameter for holding containers, it is preferable to fit the cylindrical member around the base, which is formed as a receptacle shape.

The lid member comprises a top and a bottom. The top makes atop decorative surface. The bottom makes a bottom supporter surface, which is disposed oppositely to the top decorative surface. The lid member is disposed rotatably to the base. Accordingly, the lid member is made reversible back and forth, thereby directing or facing the top decorative surface and the bottom supporter surface upward or downward alternately. Although it is allowable to form the lid member as a plate shape, it is preferable to form the lid member as a bottomed cylindrical shape. For example, the lid member can be formed as a bottomed cylindrical shape having a bottom outside surface and a bottom inside surface, and can comprise a rotary shaft being disposed at a central part thereof in height direction thereof; the bottom outside surface can make the top decorative surface; and the bottom inside surface can make the bottom supporter surface. The thus constructed present cup holder can earn or provide a greater distance or dimension from the bottom supporter surface of the lid member to the leading end of the cylindrical member when the lid member is reversed to direct or face the bottom downward. That is, the above-described preferable lid-member construction gives the present cup holder a much taller height for holding container. As a result, the preferable lid-member construction enables the present cup to stably hold a container with a much taller height. Moreover, since the preferable lid-member construction enables the present cup holder to comprise the cylindrical member with a height-wise shortened length, the present cup holder can produce a greater available passenger-room space in the vertical direction. To put it differently, it is possible to downsize the present cup holder more in the vertical direction.

Moreover, the bottom supporter surface of the lid member can preferably be provided with a first supporter surface and a step. For example, the first supporter surface can be for supporting container with smaller outside diameter; and the step can be disposed on an outer peripheral side with respect to the first supporter surface, and can have a second supporter surface being disposed higher than the first supporter surface is disposed. In the thus constructed preferable present cup holder, the first supporter surface of the lid member's bottom supporter surface can support a first container with a smaller outside diameter; and the second supporter surface of the lid member's bottom supporter surface can support a second container whose outside diameter is larger than the first surface's inside diameter. Although paper cups are usually formed as a truncated cone shape whose outside diameter decreases from large to small gradually in the direction away from the opening to the bottom, it is possible for the present cup holder to hold such a paper cup, even when it comprises the cylindrical member whose inside diameter is made smaller, because the second supporter surface, which is disposed above the first supporter surface, can support the paper cup. Therefore, the present cup holder can be downsized horizontally so that it can produce a greater available passenger-room space horizontally, because it is not necessary to provide the present cup holder with a cylindrical member that has an increased outside diameter.

In addition, the first supporter surface and second supporter surface of the lid member can be disposed concentrically to each other. However, it is preferable that the first supporter surface and second supporter surface of the lid member can have an end. Moreover, the ends of first supporter surface and second supporter surface can be disposed eccentrically so as to approach a peripheral end of the lid member, respectively. The thus constructed present cup holder can provide the first supporter surface with an enlarged inside diameter while providing the second supporter surface with an adequate area securely. As a result, the present cup holder can hold various containers with an extensive range of larger outside diameters. If such is the case, it is preferable that the present cup holder can further comprise a supporter, thereby holding a side surface of container with the supporter and an inner peripheral surface of the cylindrical member.

The present cup holder further comprises a reversing device. The reversing device is interlocked with the cylindrical member, which moves upward/downward, thereby reversing the top decorative surface and bottom decorative surface of the lid member. As for the reversing device, it is convenient to make it with a rack-and-pinion device. For example, as set forth in a later-described example, it is possible to make the reversing device by fixing a pinion gear to the lid member's pivotally-supporting shaft; and then providing the cylindrical member with a rack, which meshes with the pinion gear. Specifically, the rack as the cylindrical member moves upward/downward, and thereby the pinion gear rotates accordingly as the rack moves back and forth.

Therefore, it is possible to revere the lid member by 180 degrees by setting the moving magnitude of the rack so that the pinion gear rotates by 180 degrees exactly.

The present cup holder further comprises an urging device for urging the cylindrical member so as to move the cylindrical member upward. As for the urging device, it is possible to use known machine elements such as leaf springs and coil springs. It is allowable to directly urge the cylindrical member, or the above-described rack which is provided on the cylindrical member, with the urging device. Alternatively, it is possible to indirectly urge the rack, which is provided on the cylindrical member, with a spring, which is built-in in the above-described pinion gear itself, or with a spring which is built-in in an intermediate gear that meshes with the pinion gear.

Note that the urging device can preferably urge the reversing device, thereby actuating the reversing device. In the thus constructed preferable present cup holder, it is easy to synchronize the reversing lid member with the cylindrical member that moves upward/downward. That is, the reversing device and urging device make a simplified mechanism for driving the cylindrical member and lid member. Thus, the present cup holder can be made at more reduced cost.

The present cup holder further comprises a locking device, and an unlocking device. The locking device is for enabling the urging device to accumulate urging force, thereby retaining the cylindrical member in such a state that the cylindrical member is moved downward. The unlocking device is for canceling the retaining action of the locking device. The locking device in operation can inhibit the cylindrical member from ascending, though the urging device is accumulating urging force for urging the cylindrical member. On the other hand, the unlocking device in operation cancels the retaining or locking operation of the locking device for inhibiting the cylindrical member from ascending. Accordingly, the urging force of the urging device actuates the cylindrical member to ascend automatically, and then the ascending cylindrical member actuates the lid member to reverse. Consequently, it is possible to hold a container with an inner peripheral surface of the cylindrical member, and to support it with the bottom supporter surface of the lid member. That is, it is possible for a user to put the present cup holder in service. Note that it is possible to control a position, at which the cylindrical member ascends fully, by engaging the cylindrical member with the base, for instance.

Moreover, when a user removes the container out of the accommodation hole of the base and then presses the cylindrical member to move it downward against the urging force of the urging device, the lid member reverses to expose the top decorative surface. Then, the locking device operates to retain the cylindrical member that has moved fully downward, and thereby the lid member shuts off or covers a holder hole for holding container, that is, one of the opposite openings of the cylindrical member, with the top decorative surface being directed or facing upward. Therefore, the present cup holder demonstrates a good appearance, because the top decorative surface of the lid member is exposed within the holder hole of the cylindrical member.

On the contrary, when a user tries to make use of the present cup holder whose lid member's top decorative surface is exposed within a holder hole, that is, one of the opposite openings of the cylindrical member, he or she actuates the locking device. Then, the urging force of the urging device not only moves the cylindrical member upward but also reverses the lid member. In this instance, if a coin is placed on the top decorative surface of the lid member, the coin has fallen down into the accommodation hole of the base. As a result, it might be troublesome for the user to take the dropped coin out of the present cup holder.

In view of above, in the present cup holder, the lid member can preferably have an outer configuration being formed as a circular shape; and the accommodation hole of the base can preferably have a bottom being formed as a dented semi-spherical surface, which follows a locus that a peripheral end of the reversing lid member draws. In the thus constructed preferable present cup holder, when a user presses the cylindrical member to move downward, the descending cylindrical member rotates the lid member. Accordingly, the rotating lid member makes it possible to pick up objects, such as a dropped coin, which are present within the accommodation hole of the base. Consequently, it is possible to recover the dropped coin because the dropped coin reappears in such a state that it is put on the top decorative surface of the lid member.

EXAMPLE

Figure 1:
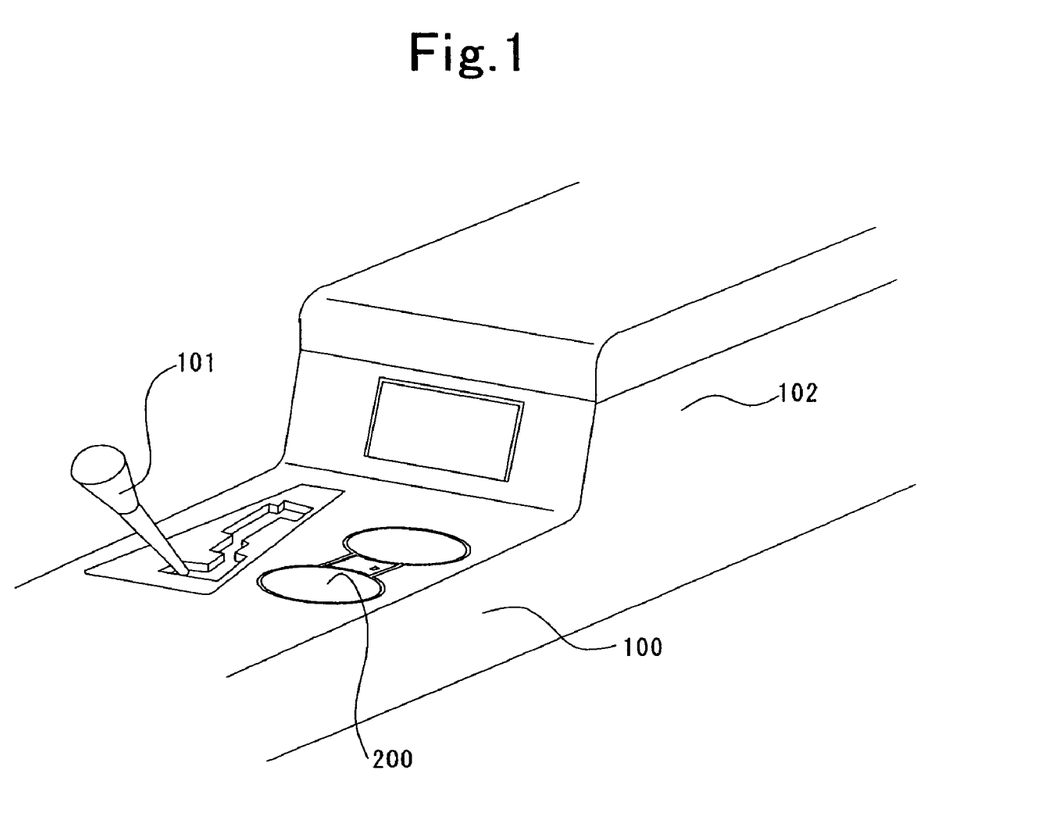
FIG. 1 is a perspective diagram for illustrating a major portion of a console, which is equipped with a cup holder according to Example of the present invention.

Hereinafter, a cup holder according to the present invention will be described with reference to Example. As illustrated in FIG. 1, the present cup holder according to Example relates to a cup holder 200 that is disposed in an automotive console 100. The automotive console 100 is provided with a shift lever 101, and a console box 102, which is disposed in front of the console 100. Moreover, the automotive console 100 is provided with a not-shown duct, which is disposed inside the console 100. The duct is for supplying air-conditioning air to a resister, which opens in the rear wall of the console box 102. Therefore, it is required that the cup holder 200 exhibit a shallower depth (or shorter height). However, if the cup holder 200 has a height being reduced too much, it is difficult for such a cup holder to stably hold a container with a taller height.

Figure 2:
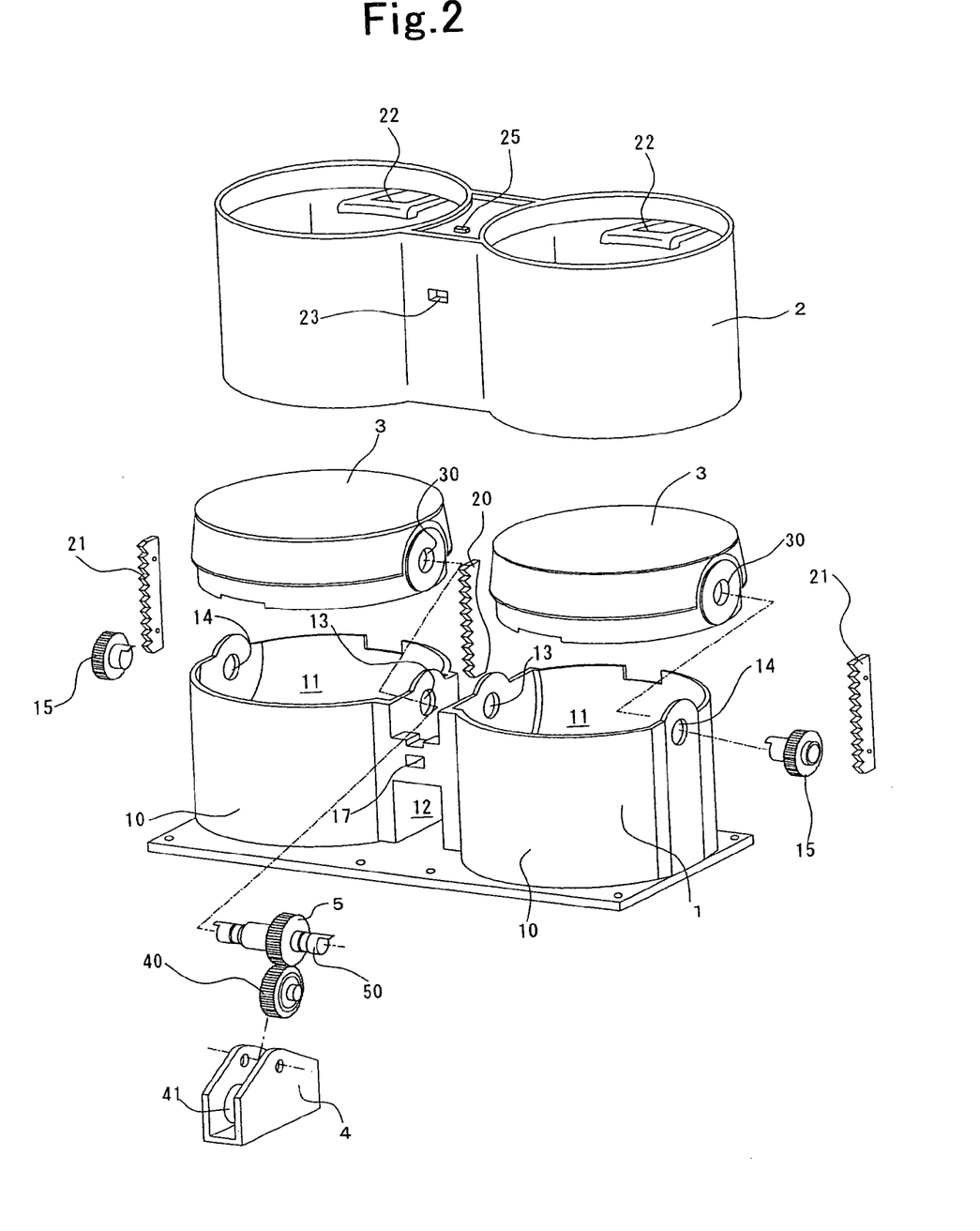
FIG. 2 is an exploded perspective diagram for illustrating a component-part construction of the present cup holder according to Example.

In view of above, the present cup holder according to Example comprises a base 1, a cylindrical member 2, and a pair of lid members, 3, 3 as shown in FIG. 2.

As illustrated in FIG. 2, the base 1 is formed as an eye-glasses shape in cross section. Specifically, the base 1 comprises a pair of bottomed cylindrical bodies 10, 10 whose facing peripheral surfaces are connected to each other. The paired bottomed cylindrical bodies 10, 10 are formed as a receptacle shape, and have an accommodation hole 11, which opens upward, respectively. Note that the part, which connects between the paired bottomed cylindrical bodies 10, 10, forms a connector space 12. In the connector space 12, a gear box 4 is fixed. The connector space 12 is provided with a pair of first through holes 13, 13. The paired first through holes 13, 13 are formed to pierce the peripheral wall of the paired cylindrical bodies 10, 10, respectively, and are disposed coaxially on the upper side of the connector space 12. Moreover, the paired cylindrical bodies 10, 10 are provided with a second through hole 14, respectively, on the opposite side of the peripheral wall that is provided with the paired first through holes 13, 13. The respective first through hole 13 and second through hole 14 are disposed coaxially on an imaginary linear line. The respective second through holes 14, 14 retain a pinion gear 15 therein, respectively.

Figure 3:
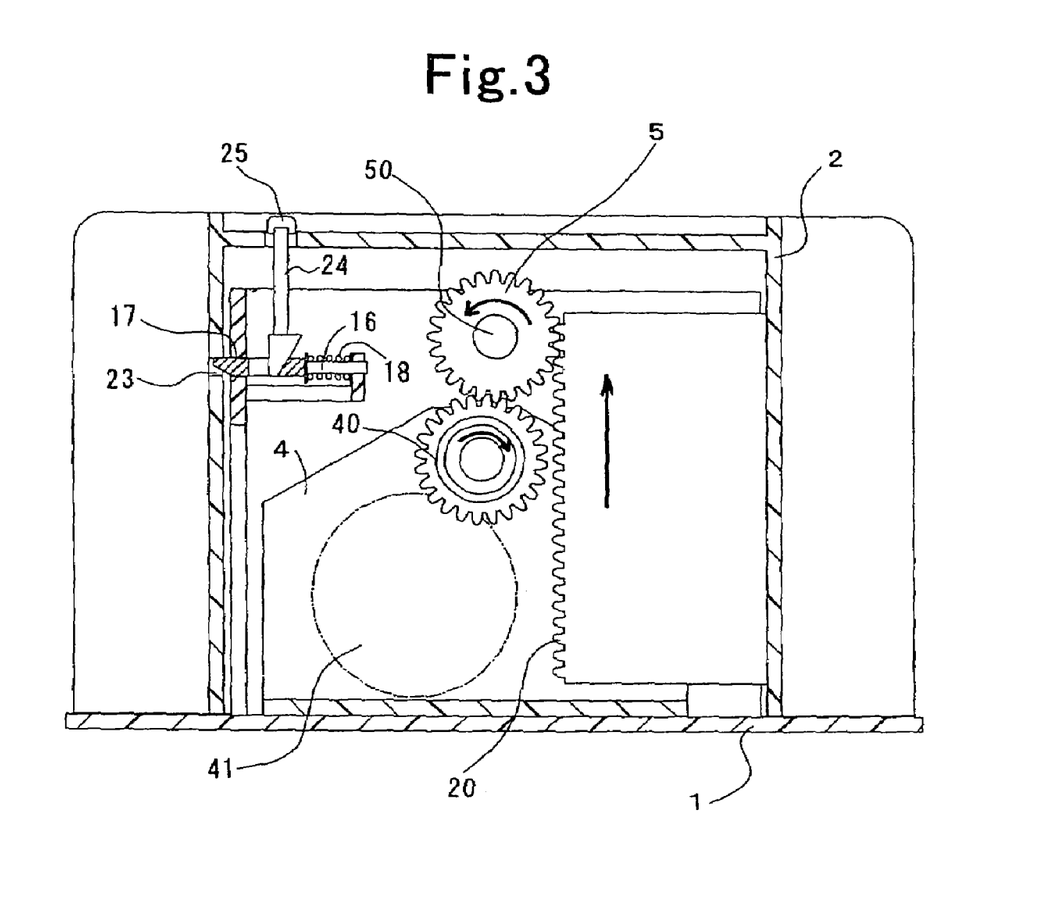
FIG. 3 is a cross-sectional diagram for illustrating the present cup holder according to Example when it is put in the non-service mode.
Figure 4:
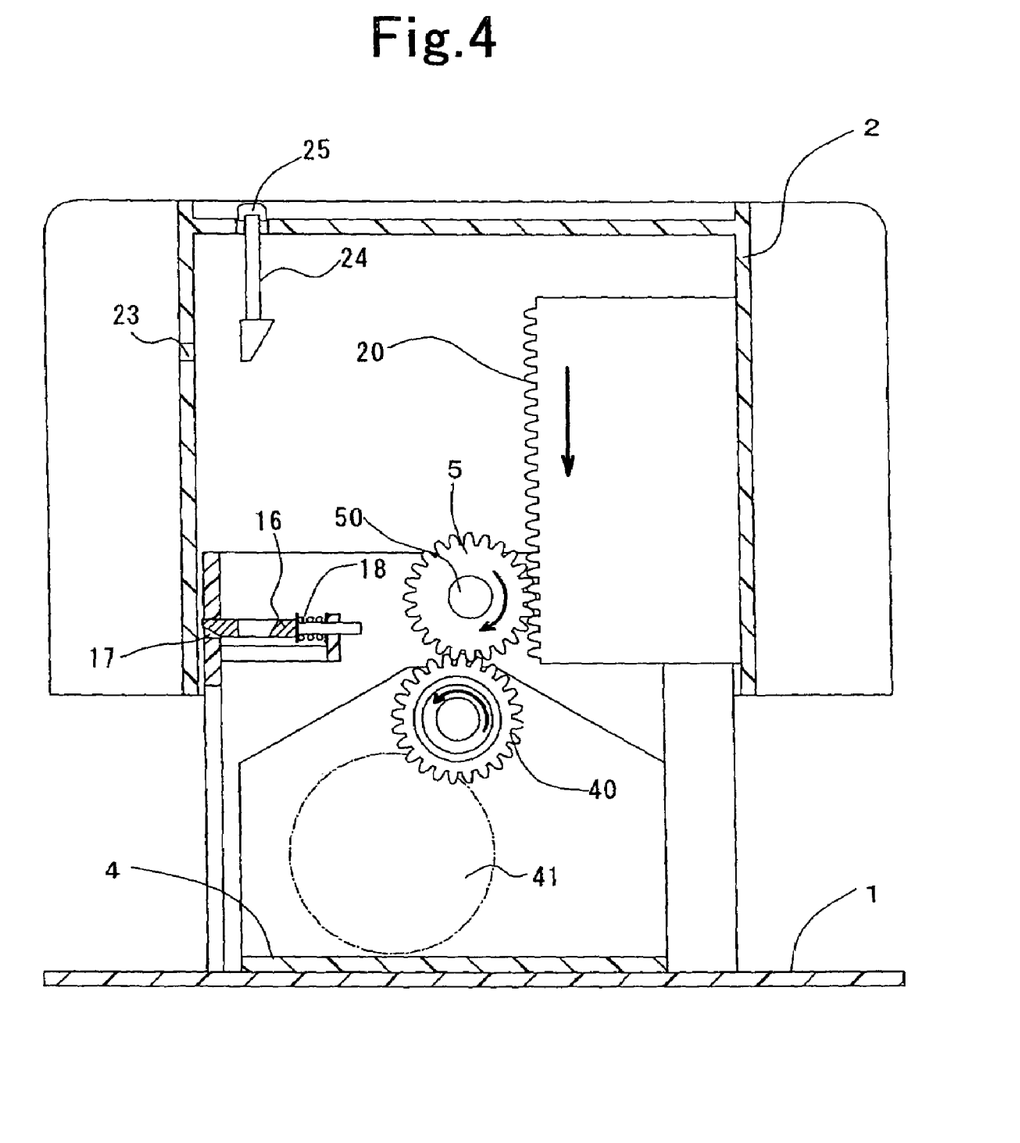
FIG. 4 is a cross-sectional diagram for illustrating the present cup holder according to Example when it is put in the service mode.

As illustrated in FIGS. 3 and 4, the gear box 4 retains a drive gear 40 rotatably therein. Note that the drive gear 40 is provided with a not-shown built-in spring. Moreover, the gear box 4 is provided with a damper 41, which brakes the drive gear 40 in operation, thereby rotating the drive gear 40 slowly and smoothly.

The drive gear 40 meshes with a main gear 5. The main gear 5 is provided with a rotary shaft 50. As can be seen from FIG. 2, the paired first through holes 13, 13 of the bottomed cylindrical bodies 10, 10 retain the rotary shaft 50 therein, respectively.

As illustrated in FIG. 2, the cylindrical member 2 is formed as a substantially cylindrical shape that is larger by about one size than the paired bottomed cylindrical bodies 10, 10 of the base 1, thereby enabling the base 1 to be inserted into the inside of the paired bottomed cylindrical bodies 10, 10. The cylindrical member 2 is provided with a central rack 20, and a pair of outside racks 21, 21. The central rack 20, which extends in the up/down direction, is fixed to a central part in an inner peripheral surface of the cylindrical member 2. The paired outside racks 21, 21 are fixed to an inner peripheral surface, respectively, on both right and left sides of the cylindrical member 2. As illustrated in FIGS. 3 and 4, the central rack 20 meshes with the main gear 5. On the other hand, as can be understood from FIG. 2, the paired outside racks 21, 21 mesh with the paired pinion gears 15, 15, respectively. Thus, the base 1 holds the cylindrical member 2 movably upward/downward relatively to itself.

Moreover, as illustrated in FIG. 2, the present cup holder according to Example further comprises a pair of dually-structured supporters 22, 22. The paired dually-structured supporters 22, 22 are retained to the cylindrical member 2 swingably, and are formed to protrude from the peripheral wall of the cylindrical member 2 diametrically inward. Note that the paired dually-structured supporters 22, 22 are provided with a not-shown spring that is fitted around their pivotally-supporting shafts, respectively. The springs urge the paired dually-structured supporters 22, 22 so as to direct their respective leading ends upward.

As illustrated in FIG. 2, the paired lid members 3, 3 are formed as a bottomed cylindrical shape respectively. The paired lid members 3, 3 have an outside diameter that is made slightly smaller than the inside diameter of the accommodation hole 11 in the base 1's paired bottomed cylindrical bodies 10, 10. The paired lid members 3, 3 are provided with a pair of retainer holes 30, 30, respectively, which are formed at symmetrical positions by 180 degrees apart in the peripheral direction, in their peripheral walls. Moreover, the drive gear 5's rotary shaft 50, which passes through the paired first through holes 13, 13 to protrude into the base 1's paired accommodation holes 11, 11, is fitted rotatably into one of the retainer holes 30, 30 of the paired lid members 3, 3. In addition, the respective rotary shafts of the base 1's paired pinion gears 15, 15, which pass through the paired second through holes 14, 14 to protrude into the base 1's paired accommodation holes 11, 11, are fitted rotatably into the other one of the retainer holes 30, 30 of the paired lid members 3, 3.

Figure 5:
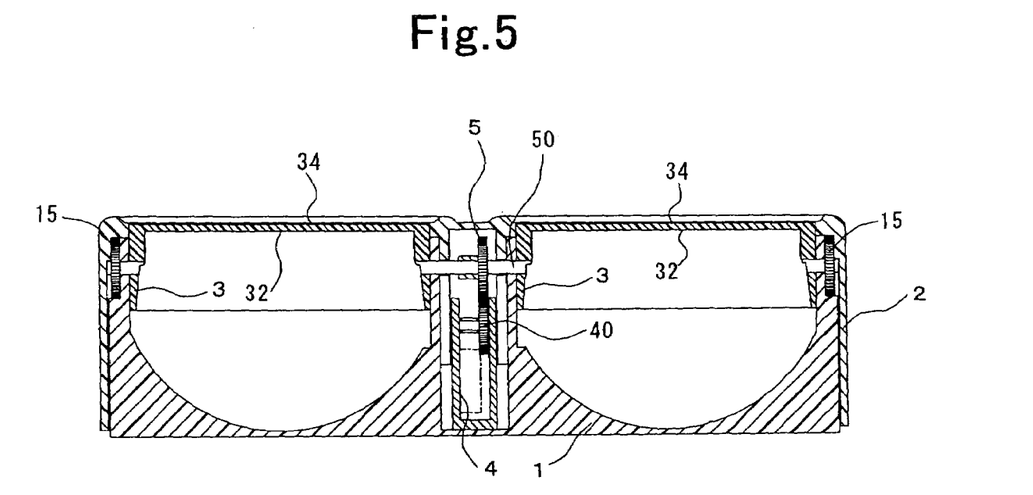
FIG. 5 is another cross-sectional diagram for illustrating the present cup holder according to Example when it is put in the non-service mode.
Figure 6:
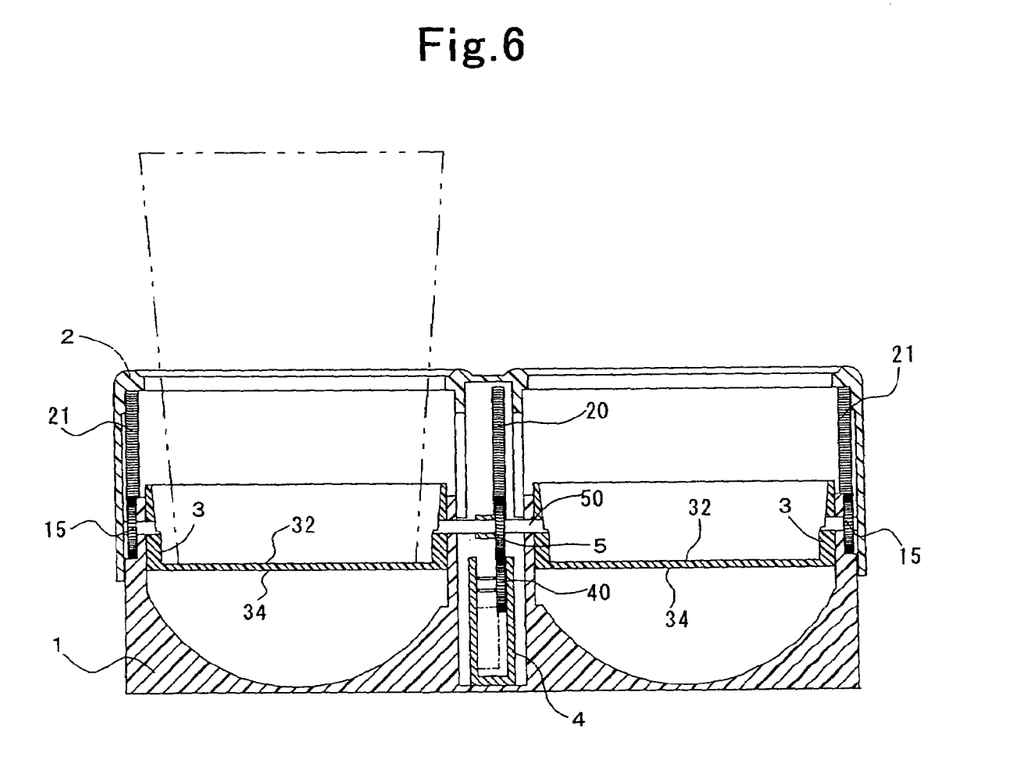
FIG. 6 is another cross-sectional diagram for illustrating the present cup holder according to Example when it is put in the service mode.
Figure 7:
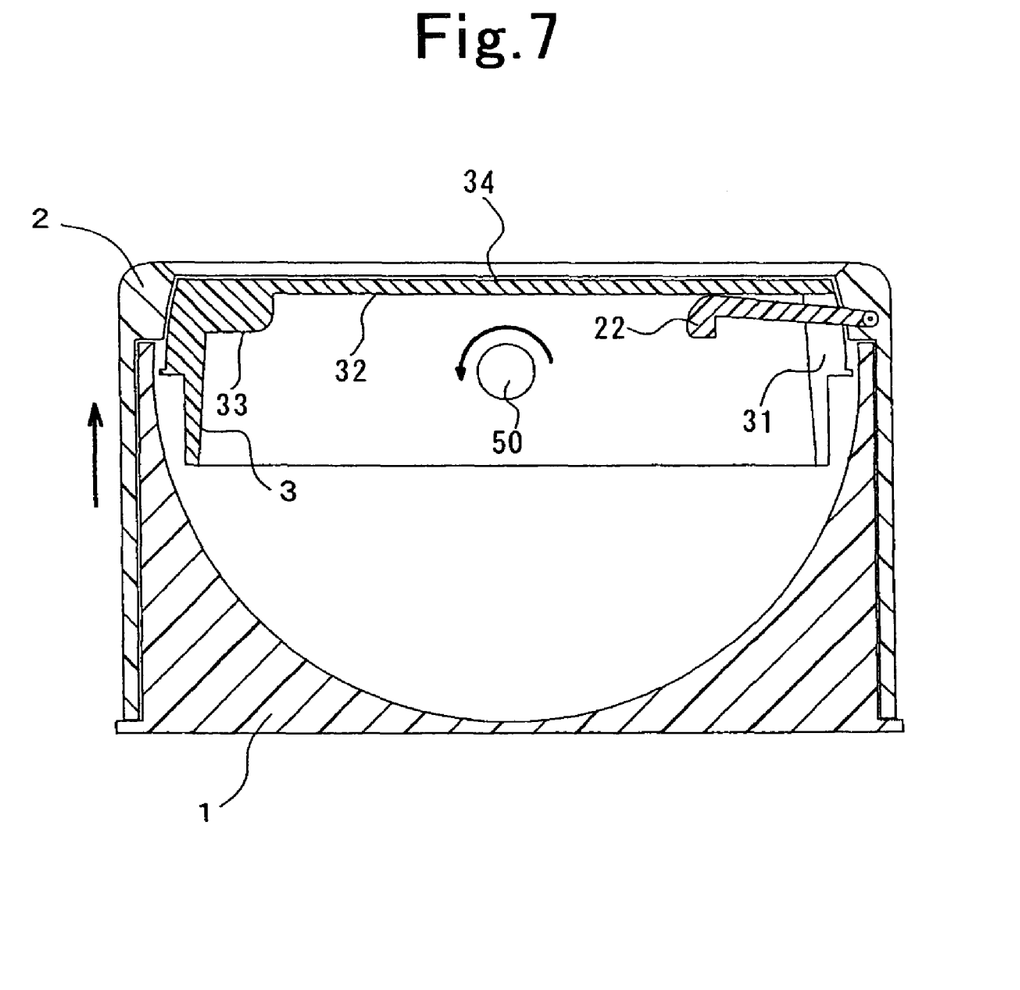
FIG. 7 is still another cross-sectional diagram for illustrating the present cup holder according to Example when it is put in the non-service mode.
Figure 8:
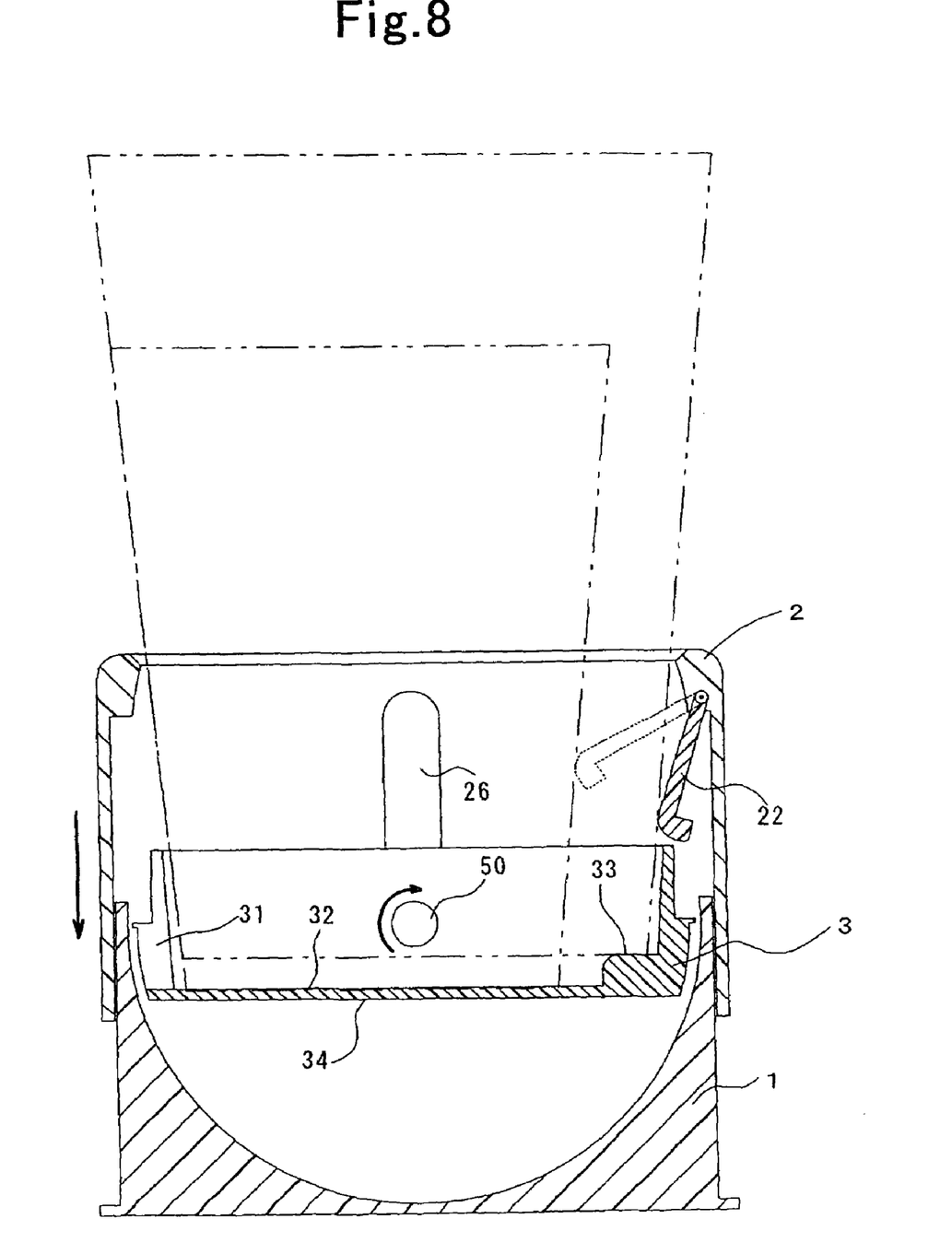
FIG. 8 is still another cross-sectional diagram for illustrating the present cup holder according to Example when it is put in the service mode.

Specifically, the paired lid members 3, 3 are retained to the base 1 rotatably about the rotary shaft 50 of the main gear 50 and about the respective rotary shafts of the paired pinion gears 15, 15. As illustrated in FIGS. 5, 6 and 7, the accommodation holes 11, 11 of the paired bottomed cylindrical bodies 10, 10 are formed as a semispherical shape, which follows a locus that the peripheral end of the rotating paired lid members 3, 3 draws. Moreover, as shown in FIGS. 7 and 8, the paired lid members 3, 3 are provided with a cut-off 31, respectively. The respective cut-offs 31 are made by cutting the peripheral wall of the paired lid members 3, 3, thereby inhibiting the rotating paired lid members 3, 3 from interfering with the cylindrical member 2's paired dually-structured supporters 22, 22. Moreover, as illustrated in FIGS. 7 and 8, the paired lid members 3, 3 are provided with a general supporter surface 32 and a step 33, respectively, on their bottom surfaces. As shown in FIG. 7, the step 33 is disposed at an opposite position with respect to the cut-off 31 peripherally, and is placed higher by one step than the general supporter surface 32 is placed. In addition, the paired lid members 3, 3 are provided with a decorative surface 34, respectively, which is disposed oppositely to the general supporter surface 32 and step 33. The decorative surfaces 34, 34 exhibit the same decorativeness as that of the decorative surface of the console 100.

Figure 9:
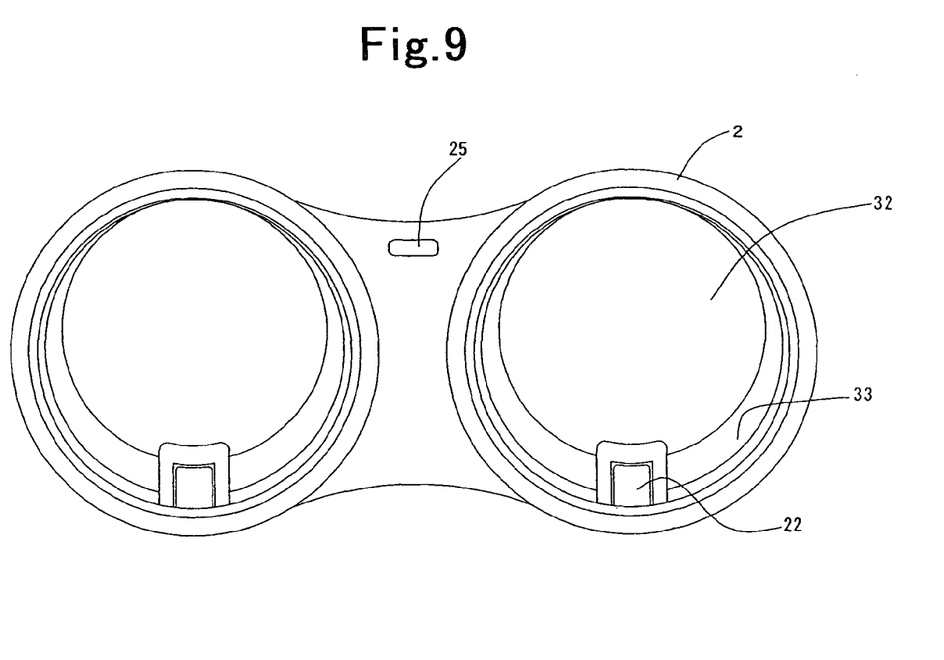
FIG. 9 is a plan-view diagram for illustrating the present cup holder according to Example when it is put in the service mode.

The outer peripheries of the general supporter surface 32 and step 33 are formed as a complete circular shape, respectively. Note that, as illustrated in FIG. 9, outer peripheral ends of the general supporter surface 32 and step 33 (or the outer peripheral upper ends in the drawing, specifically) contact the cylindrical member 2's inner peripheral surface virtually. Specifically, the centers of the general supporter surfaces 32, 32, and the centers of the steps 33, 33 are disposed eccentrically with respect to the centers of the accommodation holes 11, 11. Such an arrangement not only makes it possible to give the steps 33, 33 a sufficiently large area securely, but also makes it possible to give the general supporter surfaces 32, 32 a large inside diameter securely.

As illustrated in FIGS. 3 and 4, the connector space 12 of the base 1 retains a lock pin 16 slidably therein. The lock pin 16 penetrates a through hole 17 that is formed in the base 1, and engages with a lock hole 23 that is formed in the cylindrical member 2. Note that the lock pin 16 is provided with a spring 18, which is fitted around the lock pin 16 and is disposed between the lock pin 16 and the base 1, and that the spring 18 urges the lock pin 16 in such a direction that the lock pin 16 protrudes out of the through hole 17.

Moreover, the cylindrical member 2 retains a rod 24 movably upward/downward. The rod 24's top end protrudes from the cylindrical member 2 to make a push button 25, and its bottom end makes a tapered engagement with the lock pin 16. That is, when the rod 24 descends fully to engage with the lock pin 16, the lock pin 16 moves diametrically inward against the spring 18's urging force.

Hereinafter, how the thus constructed present cup holder 200 according to Example operates will be described with reference to FIGS. 3, 5 and 7. The drawings illustrate that the present cup holder 200 when it is not put in service. First of all, in the non-service mode, the cylindrical member 2 is placed at a fully descended position, and the paired lid members 3, 3 expose the heads, that is, the top decorative surfaces 34, 34, in the paired accommodation holes 11, 11 of the base 1 as shown in FIGS. 3, 5 and 7. Specifically, the present cup holder 200 is put in such a state that the paired lid members 3, 3 close the paired holder holes of the cylindrical member 2, the paired upper opposite openings thereof; and that the top decorative surfaces of the paired lid members 3, 3 make an integral decoration with the consol 100. Under the circumstances, note that the not-shown built-in spring, which is assembled within the drive gear 40, is wound up to accumulate urging force. As a result, the not-shown built-in spring is urging the drive gear 40 so as to rotate it in the clockwise direction in FIG. 3, and then the drive gear 40 is urging the main gear 5 so as to rotate it in the counterclockwise direction in the drawing. However, the drive gear 40 and main gear 5 do not rotate at all, because the lock pin 16 protrudes out of the through hole 17 to engage with the lock hole 23 of the cylindrical member 2 as shown in the drawing.

When a user would like to hold a container with the present cup 200 according Example, he or she first presses the push button 25 downward. Accordingly, the bottom end of the rod 24 presses the lock pin 16 so that the lock pin 16 moves in the right direction in FIG. 3. Consequently, the lock pin 16 disengages from the lock hole 23 of the cylindrical member 2.

As a result, the not-shown built-in spring rotates the drive gear 40 by the accumulated urging force in the clockwise direction in FIG. 3. Then, the drive gear 40 rotates the main gear 5 in the counterclockwise direction in the drawings, thereby ascending the central rack 20. That is, the rotating main gear 5 rotates the paired lid members 3, 3, which are fixed to its rotary shaft 50, to direct the heads, that is, the top decorative surfaces 34, 34, toward a viewer of FIG. 5 in the drawing, and rotate the paired lid members 3, 3 in the counterclockwise direction in FIG. 7. Moreover, when the main gear 5 rotates, the central rack 50 ascends simultaneously with therewith, thereby raising the cylindrical member 2.

In this instance, the presence of the cut-offs 31, 31 prevents the paired lid members 3, 3 from interfering with the paired supporters 22, 22, or vice versa. Moreover, since the cylindrical member 2 is provided with a pair of cut-offs 26, 26 as shown in FIG. 8, the cylindrical member 2 is prevented from interfering with the rotary shaft 50 of the main gear 5. In addition, not only the main gear 5 meshes with the central rack 20, but also the paired pinion gears 15, 15 mesh with the paired outside racks 21, 21. As a result, the main gear 5 and central rack 20, and the pinion gears 15, 15 and outside racks 21, 21 not only enable the cylindrical member 2 to ascend smoothly and stably, but also enable the paired lid members 3, 3 to rotate smoothly and stably.

Thereafter, the not-shown spring, which is built-in in the drive gear 40, not only rotates the paired lid members 3, 3 but also raises the cylindrical member 2 by the accumulated urging force. Eventually, with the paired lid members 3, 3 being reversed by 180 degrees, a not-shown stopper stops the paired lid members 3, 3 rotating, and stops the cylindrical member 2 ascending.

FIGS. 4, 6, 8 and 9 illustrate that the present cup holder 200 according to Example when it is put in service. In the service mode, the paired lid members 3, 3 are reversed to direct their receptacle-shaped insides upward. Specifically, the paired general supporting surfaces 32, 32 of the paired lid members 3, 3 are positioned down below the rotary shaft 50 of the main gear 50 as shown in FIGS. 6 and 8, and the paired lid members 3, 3 and cylindrical member 2 exhibit a sufficiently high dimension from the paired general supporting surfaces 32, 32 to the paired holder openings of the cylindrical member 2. Therefore, as shown in FIG. 6, the present cup holder 200 can hold a container stably. Moreover, the paired top decorative surfaces 34, 34 of the paired lid members 3, 3 are not damaged at all, because the container is out of contact with the top decorative surfaces 34, 34.

In addition, when a user would like to hold a container whose bottom has a larger outside diameter, the present cup holder 200 according to Example supports such a container with the step 33 of one of the paired lid members 3, 3 as illustrated in FIG. 8. Accordingly, the container exhibits a smaller outside diameter at one of the paired holder openings of the cylindrical member 2 than that when it is received with the general supporter surface 32 of one of the paired lid members 3, 3. Consequently, without ever being required to make the size of the cylindrical member 2 greater, the present cup holder 200 can hold a container with a larger bottom outside diameter.

Moreover, the paired supporters 22, 22, which are urged to swing upward, contact with a peripheral surface of container, and thereby supporting the container's peripheral surface between the supporters 22, 22 and an inner peripheral surface of the cylindrical member 2. Therefore, the present cup holder 200 according to Example can hold stably a wide variety of containers from those having a smaller outside diameter to those having a larger outside diameter free of any ricketiness or shakiness.

All in all, the present cup holder 200 according to Example can hold various cups without ever providing the base 1's accommodation holes 11, 11 with enlarged depth and inside diameter. Therefore, it is possible to incorporate the present cup holder 200 into the console 100 shown in FIG. 1 as well, console 100 which produces considerable limitations in view of available passenger-room space.

On the other hand, when a user finishes using the present cup holder 200 according to Example, he or she pushes the cylindrical member 2 downward after he or she takes the container out of one of the paired accommodation holes 11, 11 of the base 1. Then, the central rack 20 and paired outside racks 21, 21 go down together with the cylindrical member 2. Subsequently, the main gear 5 rotates in the clockwise direction as designated in FIG. 4, thereby rotating the paired lid members 3, 3 in the clockwise direction as designated in FIG. 8. Moreover, as the main gear 5 thus rotates, the drive gear 40 rotates in the counterclockwise direction as designated in FIG. 4, and thereby the built-in spring, which is disposed in the drive gear 40, accumulates urging force again. When the paired lid members 3, 3 are reversed oppositely by 180 degrees as illustrated in FIG. 5, the lock pin 16 engages with the lock hole 23 of the cylindrical member 2 as shown in FIG. 3. Eventually, the cylindrical member 2 is fastened in place as illustrated in FIG. 3, and the paired lid members 3, 3 are fastened in place as shown in FIG. 5.

Now let us assume a situation in which, for instance, a coin is placed on the top decorative surface 34 of one of the paired lid members 3, 3 in the present cup holder 200 according to Example that is put under the condition illustrated in FIGS. 5 and 7. If such is the case, when a user pushes the push button 25 downward to cancel the lock between the lock pin 16 and the lock hole 23 of the cylindrical member 2, the paired lid members 3, 3 rotate so that the coin has fallen down into the corresponding accommodation hole 11.

However, note herein that the present cup holder 200 according to Example comprises the paired accommodation holes 11, 11, which make a semispherical surface that follows a locus of the rotating paired accommodation holes 3, 3 as illustrated in FIGS. 5, 6, 7 and 8. Accordingly, when a user pushes the cylindrical member 2 downward after he or she finishes using the present cup holder 200, the peripheral end of the lid members 3, 3 moves along the semisphere-shaped accommodation holes 11, 11. Consequently, one of the lid members 3, 3 picks up the coin, which has been present in one of the accommodation-holes 11, 11, as it moves along the one of the accommodation holes 11, 11. Eventually, the coin reappears in such a state that it has got onto the exposed head or top surface of the corresponding lid member 3 (that is, the corresponding top decorative surface 34), which is disposed oppositely to the unexposed tail or bottom surface of the corresponding lid member 3 (that is, the corresponding general supporter surface 32).

Having now fully described the present invention, it will be apparent to one of ordinary skill in the art that many changes and modifications can be made thereto without departing from the spirit or scope of the present invention as set forth herein including the appended claims.

What is claimed is:
1. A cup holder, comprising:
   a base being formed as a container shape, and having an accommodation hole being opened upward;
   a cylindrical member having opposite openings, being fitted around the base, being disposed coaxially with the accommodation hole of the base, and being disposed movably in up/down direction;

an urging device for urging the cylindrical member so as to move the cylindrical member upward;

a locking device for enabling the urging device to accumulate urging force, thereby retaining the cylindrical member in such a state that the cylindrical member is moved downward;

an unlocking device for canceling the retaining action of the locking device;

a lid member being disposed rotatably to the base, and having a top and a bottom, the top making a top decorative surface, the bottom making a bottom supporter surface being disposed oppositely to the top decorative surface, the top decorative surface and the bottom supporter surface being made reversible within the cylindrical member;

a reversing device being interlocked with the cylindrical member, which moves upward/downward, thereby reversing the top decorative surface and bottom decorative surface of the lid member;

a non-service position at which the cylindrical member descends fully, the lid member closes one of the opposite openings of the cylindrical member, and the top decorative surface of the lid member is exposed; and a service position at which the cylindrical member ascends fully, and the lid member is reversed to expose the bottom supporter surface, thereby supporting a bottom of container, which is inserted into the accommodation hole of the cylindrical member, with the bottom supporter surface of the lid member.

2. The cup holder according to claim 1, wherein the urging device urges the reversing device, thereby actuating the reversing device.

3. The cup holder according to claim 1, wherein:

the lid member is formed as a bottomed cylindrical shape having a bottom outside surface and a bottom inside surface, and comprises a rotary shaft being disposed at a central part thereof in height direction thereof;

the bottom outside surface makes the top decorative surface; and the bottom inside surface makes the bottom supporter surface.

4. The cup holder according to claim 1, wherein:

the lid member has an outer configuration being formed as a circular shape; and the accommodation hole of the base has a bottom being formed as a dented semispherical surface, which follows a locus that a peripheral end of the reversing lid member draws.

5. The cup holder according to claim 1, wherein:

the cylindrical member comprises a rack;

the base comprises a pinion gear meshing with the rack of the cylindrical member and being supported pivotably to the base; and the pinion gear of the base comprises a pivotally-supporting shaft being capable of fastening onto the lid member, thereby making the reversing device when being fastened to the lid member.

6. The cup holder according to claim 1, wherein the bottom supporter surface of the lid member comprises:

a first supporter surface for supporting container with smaller outside diameter; and a step being disposed on an outer peripheral side with respect to the first supporter surface, and having a second supporter surface being disposed higher than the first supporter surface is disposed.

7. The cup holder according to claim 6 further comprising a supporter being disposed swingably to the cylindrical member and being urged so as to project diametrically inward, wherein:

the first supporter surface and second supporter surface of the lid member have an end, which is disposed eccentrically so as to approach a peripheral end of the lid member, respectively, thereby holding a side surface of container with the supporter and an inner peripheral surface of the cylindrical member.

* * * * *